(12) United States Patent
Dent (10) Patent No.: US 12,410,988 B1
(45) Date of Patent: Sep. 9, 2025

(54) FOREARM GRIP FOR A FIREARM

(71) Applicant: Andrew Dent, Cape Coral, FL (US)

(72) Inventor: Andrew Dent, Cape Coral, FL (US)

( * ) Notice: Subject to any disclaimer, the term of this patent is extended or adjusted under 35 U.S.C. 154(b) by 0 days.

(21) Appl. No.: 18/598,783

(22) Filed: Mar. 7, 2024

(51) Int. Cl.
| | | |
|---|---|---|
| *F41C 23/16* | (2006.01) | |
| *F41A 23/06* | (2006.01) | |
| *F41C 27/18* | (2006.01) | |
| *F41G 1/35* | (2006.01) | |
| *G02B 27/20* | (2006.01) | |

(52) U.S. Cl.
CPC ............. *F41C 23/16* (2013.01); *F41A 23/06* (2013.01); *F41C 27/18* (2013.01); *F41G 1/35* (2013.01); *G02B 27/20* (2013.01)

(58) Field of Classification Search
CPC ................................ F41C 23/16; F41C 23/12
USPC ........................................................ 42/72, 94
See application file for complete search history.

(56) References Cited

U.S. PATENT DOCUMENTS

| | | | |
|---|---|---|---|
| 5,064,988 A | 11/1991 | Enama | |
| 5,345,706 A * | 9/1994 | Brown | F41A 23/06 |
| | | | 42/94 |
| 7,676,975 B2 | 3/2010 | Phillips | |
| 7,866,083 B2 * | 1/2011 | Teetzel | F41G 1/35 |
| | | | 42/117 |
| 8,117,782 B2 | 2/2012 | Gross | |
| 8,607,492 B2 | 12/2013 | Hartley | |
| 8,627,591 B2 | 1/2014 | Moore | |
| 9,062,933 B1 | 6/2015 | Allen | |
| 9,234,722 B2 * | 1/2016 | Rice | F41C 23/16 |
| D876,572 S | 2/2020 | Ding | |
| 10,845,157 B2 | 11/2020 | Chavez | |
| 10,942,004 B2 * | 3/2021 | Grenier | F41C 23/14 |
| 10,982,927 B2 * | 4/2021 | Bonesteel | F41C 23/16 |
| 11,499,797 B2 * | 11/2022 | Mantas | F41C 23/16 |
| 2009/0193702 A1 * | 8/2009 | Lin | F41C 23/16 |
| | | | 42/72 |
| 2014/0338245 A1 * | 11/2014 | Lanasa | F41C 23/16 |
| | | | 42/72 |

FOREIGN PATENT DOCUMENTS

| | | |
|---|---|---|
| GB | 2470964 | 12/2010 |
| KR | 102085462 B1 * | 3/2020 |

\* cited by examiner

*Primary Examiner* — Reginald S Tillman, Jr.

(57) ABSTRACT

A firearm attachment for supporting a firearm and mounting accessories to the firearm includes a handguard which is shaped to mount to a barrel of the firearm and a monopod which is removably coupled to the handguard. The monopod is removable from the handguard and may have a tool attached to it so that the monopod may be used as a handle for the tool. A flashlight and a laser emitter may be removably attached to the handguard to illuminate an area in front of the firearm and facilitate aiming the firearm. The flashlight and the laser emitter may also be removable to be usable independently of the handguard and the firearm.

3 Claims, 7 Drawing Sheets

FOREARM GRIP FOR A FIREARM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to firearm attachments and more particularly pertains to a new firearm attachment for supporting a firearm and mounting accessories to the firearm.

(2) Description of Related Art Including Information Disclosed Under 37 CFR 1.97 and 1.98

Myriad attachments are known to the prior art which may be attached to the barrel and used to facilitate holding or supporting the firearm, illuminate an area in front of the firearm, or aid in aiming the firearm. But the prior art fails to describe such an apparatus which includes a pivotable, removable monopod and a tool deployable from the monopod such that the monopod may be used as a handle for the tool in separation from the handguard. The prior art also fails to describe such an apparatus which includes a removable flashlight and a removable laser light emitter.

BRIEF SUMMARY OF THE INVENTION

An embodiment of the disclosure meets the needs presented above by generally comprising a handguard configured to mount to a barrel of the firearm and a monopod removably coupled to a bottom side of the handguard via a monopod fastener. The monopod is elongated between proximal and distal ends relative to the handguard. The monopod is movable between an extended position and a retracted position. When the monopod is in the extended position, the monopod extends downwardly away from the handguard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The Disclosure Will be Better Understood and Objects Other than Those Set Forth Above Will Become Apparent when Consideration is Given to the Following Detailed Description Thereof. Such Description Makes Reference to the Annexed Drawings Wherein.

DETAILED DESCRIPTION OF THE INVENTION

With reference now to the drawings, and in particular to FIGS. 1 through 7 thereof, a new firearm attachment embodying the principles and concepts of an embodiment of the disclosure and generally designated by the reference numeral 10 will be described.

As best illustrated in FIGS. 1 through 7, the firearm attachment 10 generally comprises a handguard 12 which has a tubular shape for receiving a barrel 112 of a firearm 110 therein. A front end 14 and a back end 16 of the handguard 12 are open into an interior space of the handguard 12. The barrel 112 of the firearm 110 inserts into the interior space of the handguard 12 via the back end 16 and extends out of the front end 14 when the handguard 12 is attached to the firearm 110. Upon receiving the barrel 112 into the interior space of the handguard 12, the handguard 12 may be attached to the firearm 110 via threaded fasteners, a snap connection, a latch, or other suitable fastening means. A rail 22 is attached to a top side 18 of the handguard 12 which may be used to mount accessories to the firearm 110. The rail 22 extends between the front end 14 and the back end 16 of the handguard 12 and defines a plurality of grooves 24 which extend transversely with respect to a front-to-back axis of the handguard 12.

A monopod 26 for supporting the barrel 112 of the firearm 110 on a support surface is coupled to a bottom side 20 of the handguard 12. The monopod 26 is elongated between proximal and distal ends 28, 30 relative to the handguard 12. The monopod 26 is pivotable at a point near the proximal end 28 between an extended position 38 and a retracted position 36. In the extended position 38, the monopod 26 extends away from the bottom side 20 of the handguard 12.

In the retracted position 36, the monopod 26 extends forwardly along the handguard 12. The distal end 30 tapers to a point. The monopod 26 is also sized to be grasped by a user's hand when in the extended position 38. A front surface 32 of the monopod 26 faces forwardly relative to the handguard 12 when the monopod 26 is in the extended position 38. The front surface 32 defines a plurality of recesses 34 sized and configured to receive the user's fingers therein, thereby enhancing the user's grip on the monopod 26.

A monopod fastener 40 removably couples the monopod 26 to the handguard 12. The monopod fastener 40 comprises an insertion member 42 coupled to the handguard 12 and a receiving member 44 coupled to the monopod 26, wherein the insertion member 42 is receivable into the receiving member 44. The monopod fastener 40 further comprises a latch member 46 which is coupled to the monopod 26 and is biased via a spring 48 or other suitable member to interlock with the insertion member 42. The latch member 46 protrudes through the front surface 32 of the monopod 26 such that the latch member 46 may be actuated against bias to release the insertion member 42 and allow removal of the monopod 26 from the handguard 12. In other embodiments, the monopod 26 may be attached to the handguard 12 via a threaded fastener, a snap connection, a magnet, or another suitable fastening member.

A flashlight module 50 and a laser emitter module 62 are removably mounted to the handguard 12 by a flashlight mount 74 and a laser emitter mount 80 respectively. The flashlight mount 74 and the laser emitter mount 80 are positioned opposite each other across the monopod 26. The flashlight module 50 and the laser emitter module 62 attach to the handguard 12 so they emit light forwardly with respect to the handguard 12. The flashlight mount 74 comprises a flashlight receiver 76 which receives the flashlight module 50 therein and a flashlight magnet 78 mounted to the flashlight module 50 that secures the flashlight magnetically in the flashlight receiver 76. The flashlight mount 74 may have another magnet affixed to the flashlight receiver 76 or comprise a ferromagnetic material such that the flashlight magnet 78 is magnetically attracted to the flashlight receiver 76.

Similarly, the laser emitter mount 80 comprises a laser emitter receiver 82 which receives the laser emitter module 62 therein and a laser emitter magnet 84 mounted to the laser emitter module 62 that secures the laser emitter magnetically in the laser emitter receiver 82. The laser emitter mount 80 may have another magnet affixed to the laser emitter receiver 82 or comprise a ferromagnetic material such that the laser emitter magnet 84 is magnetically attracted to the laser emitter receiver 82.

The flashlight module 50 comprises a flashlight housing 52, an illumination light source 54, a flashlight power supply 56, a flashlight switch 58, and a flashlight charging port 60. The flashlight power supply 56 comprises a flashlight battery but may comprise a capacitor or other suitable power source. The flashlight switch 58 is electrically coupled to the flashlight power source and the illumination light source 54 and is operable to activate the illumination light source 54 to emit an illuminating light forwardly of the handguard 12 when the flashlight module 50 is mounted to the handguard 12. The flashlight module 50 may also be used as a typical flashlight separate from the handguard 12. The flashlight charging port 60 is mounted to the flashlight housing 52 and is electrically coupled to the flashlight power supply 56 to facilitate charging the flashlight power supply 56. The flashlight charging port 60 is magnetized to facilitate connection to a magnetic charging cord. The flashlight housing 52 seals against the illumination light source 54, the flashlight switch 58, and the flashlight charging port 60 to prevent water from entering the flashlight housing 52 and interfere with electrical components.

Similarly, the laser emitter module 62 comprises a laser emitter housing 64, an laser light source 66, a laser emitter power supply 68, a laser emitter switch 70, and a laser emitter charging port 72. The laser emitter power supply 68 comprises a laser emitter battery but may comprise a capacitor or other suitable power source. The laser emitter switch 70 is electrically coupled to the laser emitter power source and the laser light source 66 and is operable to activate the laser light source 66 to emit a visible laser forwardly of the handguard 12 when the laser emitter module 62 is mounted to the handguard 12. The laser emitter module 62 is usable to aim the firearm 110 when mounted to the handguard 12. When removed from the handguard 12, the laser emitter module 62 may be used as a typical laser pointer to indicate remote objects. The laser emitter charging port 72 is mounted to the laser emitter housing 64 and is electrically coupled to the laser emitter power supply 68 to facilitate charging the laser emitter power supply 68. The laser emitter charging port 72 is magnetized to facilitate connection to a magnetic charging cord. The laser emitter housing 64 seals against the laser light source 66, the laser emitter switch 70, and the laser emitter charging port 72 to prevent water from entering the laser emitter housing 64 and interfering with electrical components.

Alignment members 86 protrude from the flashlight module 50 and the laser emitter module 62 which fit into notches 88 in the flashlight receiver 76 and the laser emitter receiver 82 respectively when the flashlight module 50 and the laser emitter module 62 are mounted to the handguard 12. The alignment members 86 orient the flashlight module 50 and the laser emitter module 62 such that the flashlight switch 58, the laser emitter switch 70, the flashlight charging port 60, and the laser emitter charging port 72 are not obstructed by the handguard 12 or the monopod 26.

Figure 1:
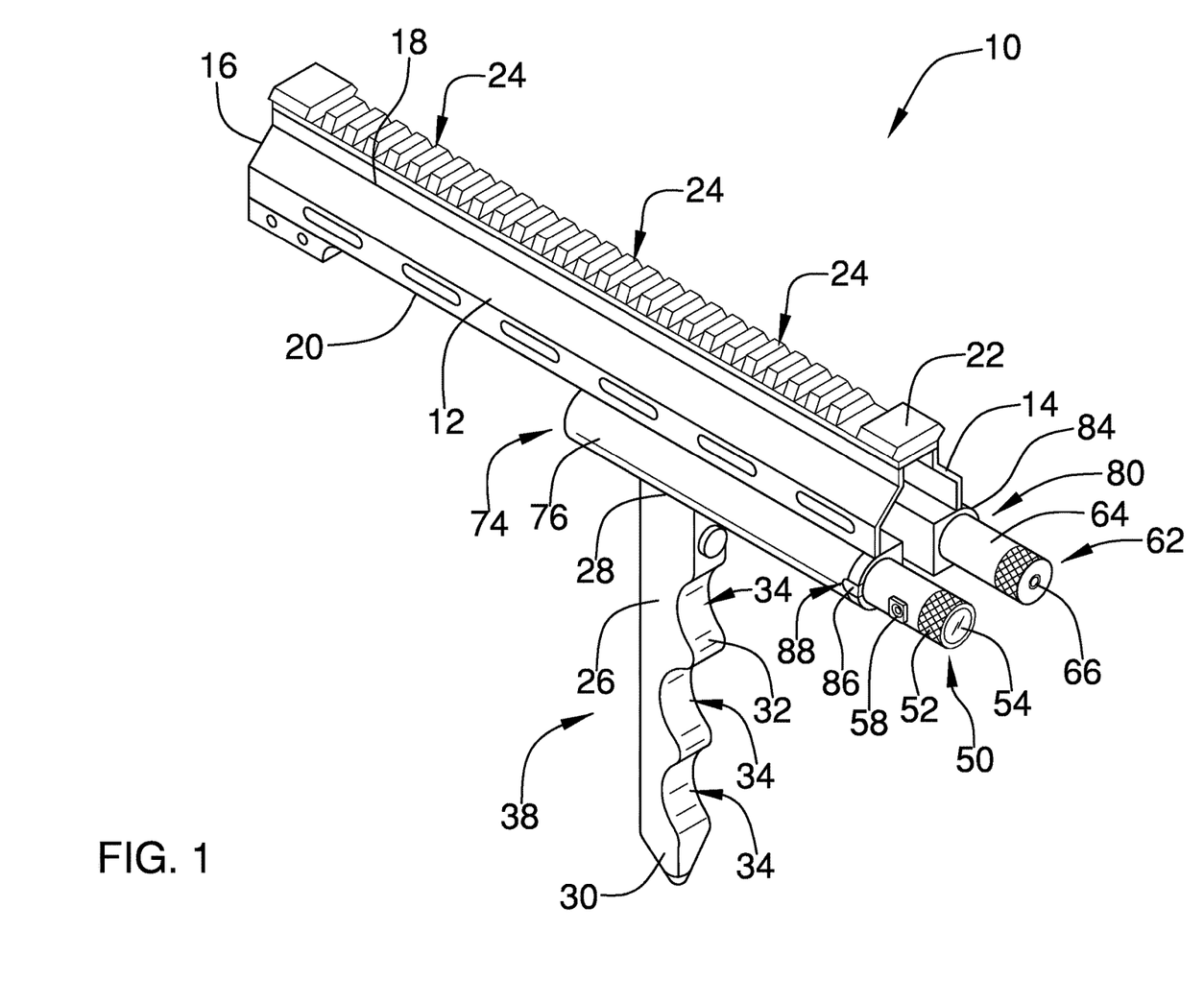
FIG. 1 is a top perspective view of a firearm attachment according to an embodiment of the disclosure.
Figure 2:
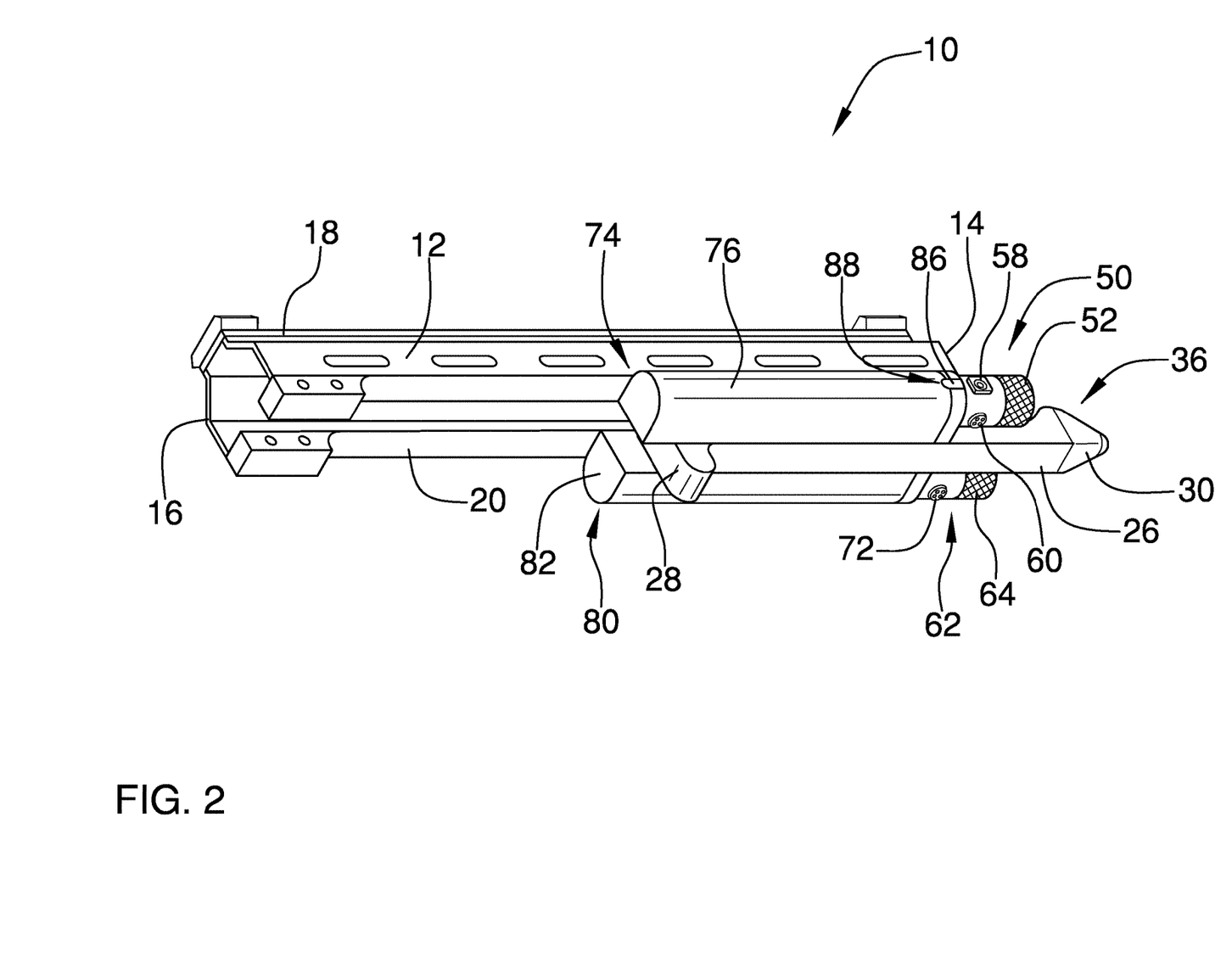
FIG. 2 is a bottom perspective view of an embodiment of the disclosure.
Figure 3:
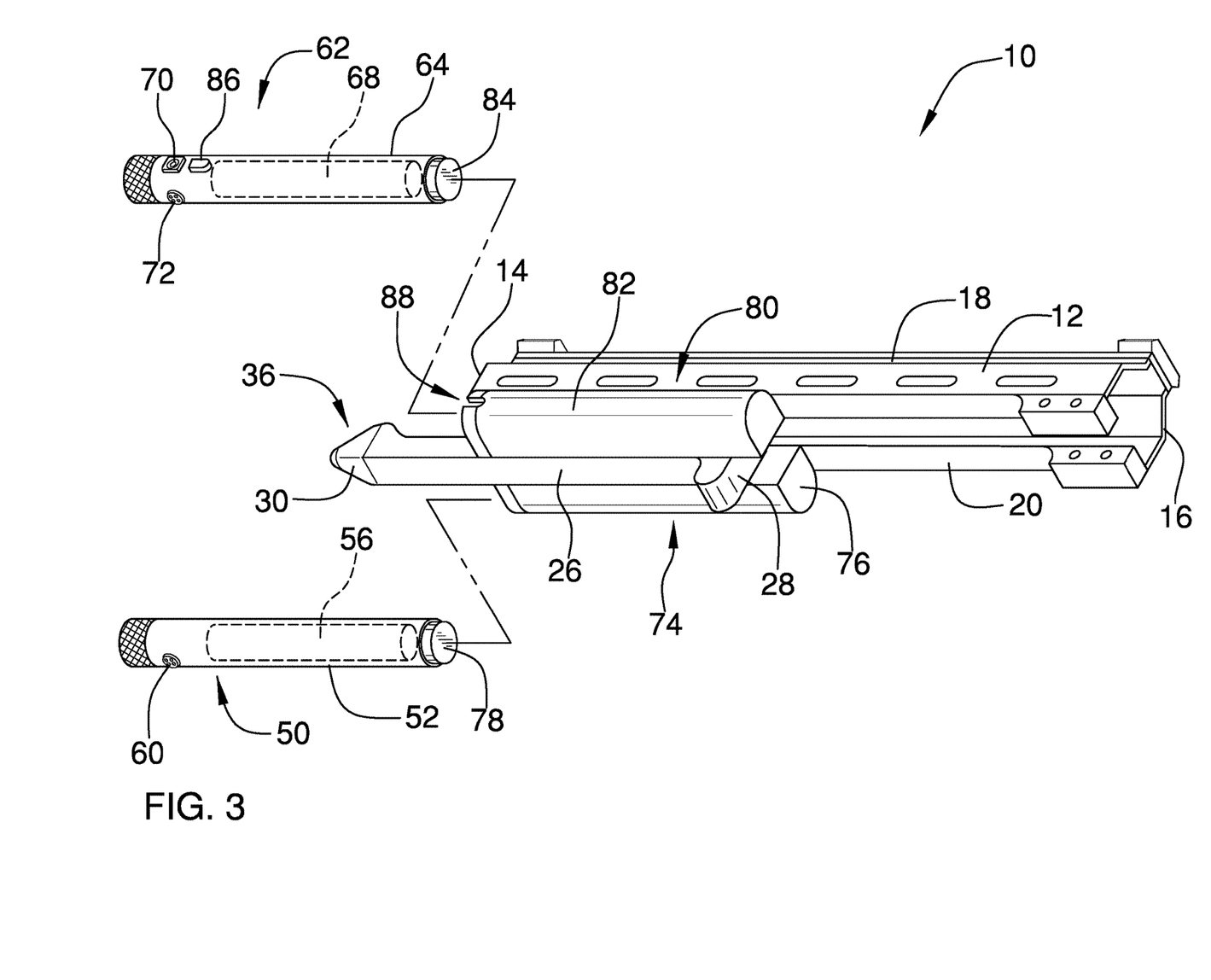
FIG. 3 is an exploded view of an embodiment of the disclosure.
Figure 4:
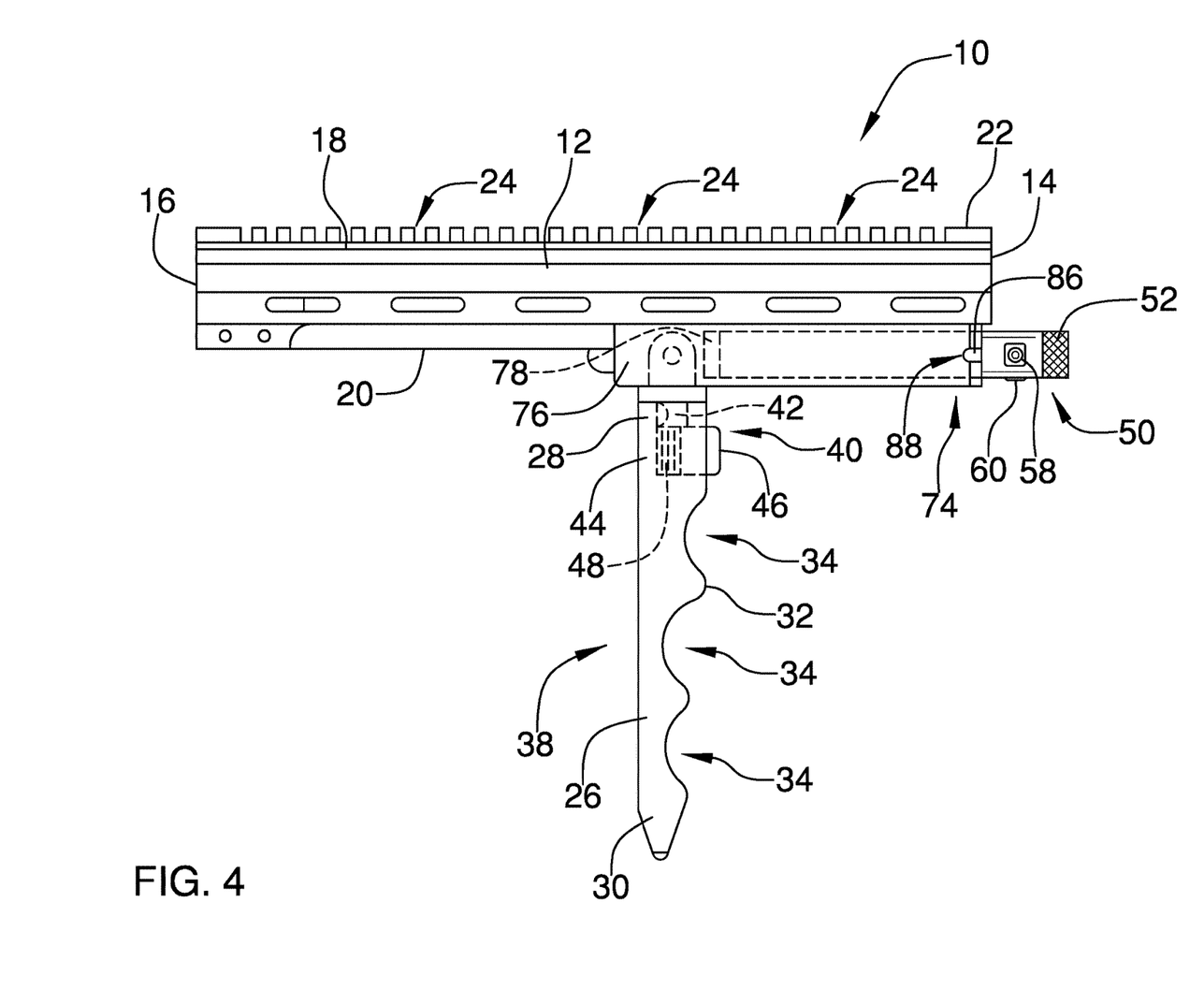
FIG. 4 is a side view of an embodiment of the disclosure which shows a monopod in an extended position.
Figure 5:
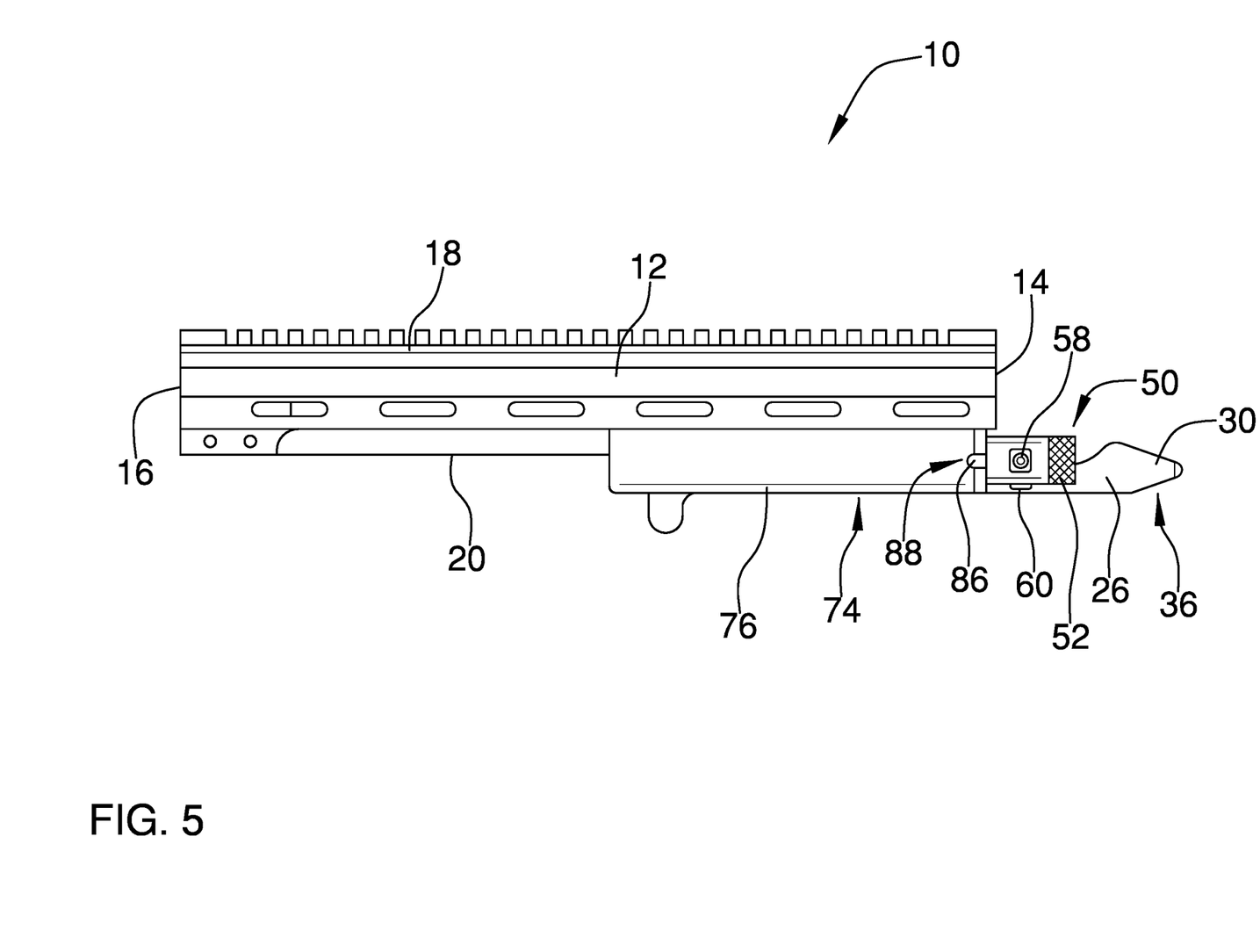
FIG. 5 is a side view of an embodiment of the disclosure which shows a monopod in a retracted position.
Figure 6:
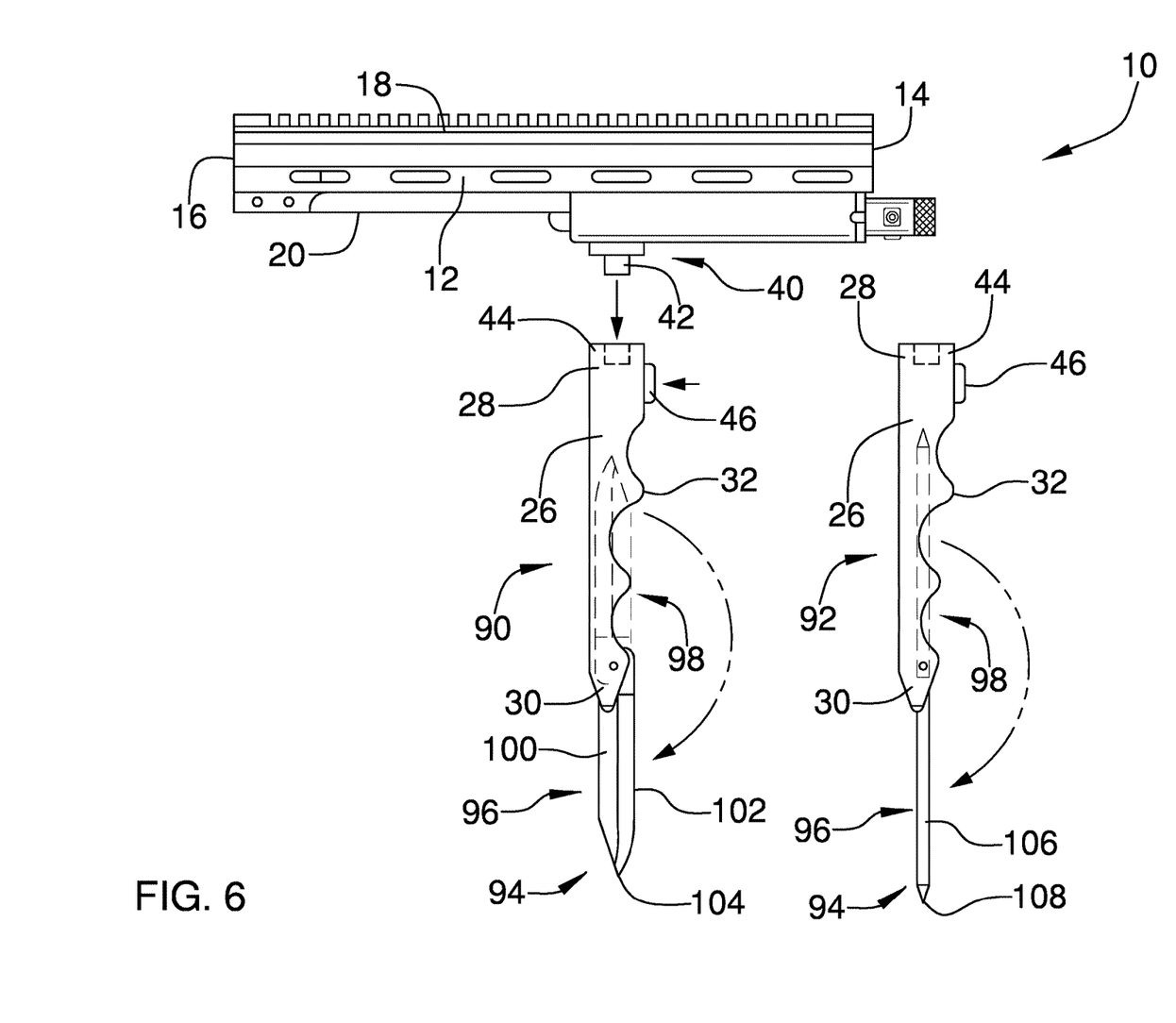
FIG. 6 is an exploded view of an embodiment of the disclosure and a pair of monopods with attached tools.
Figure 7:
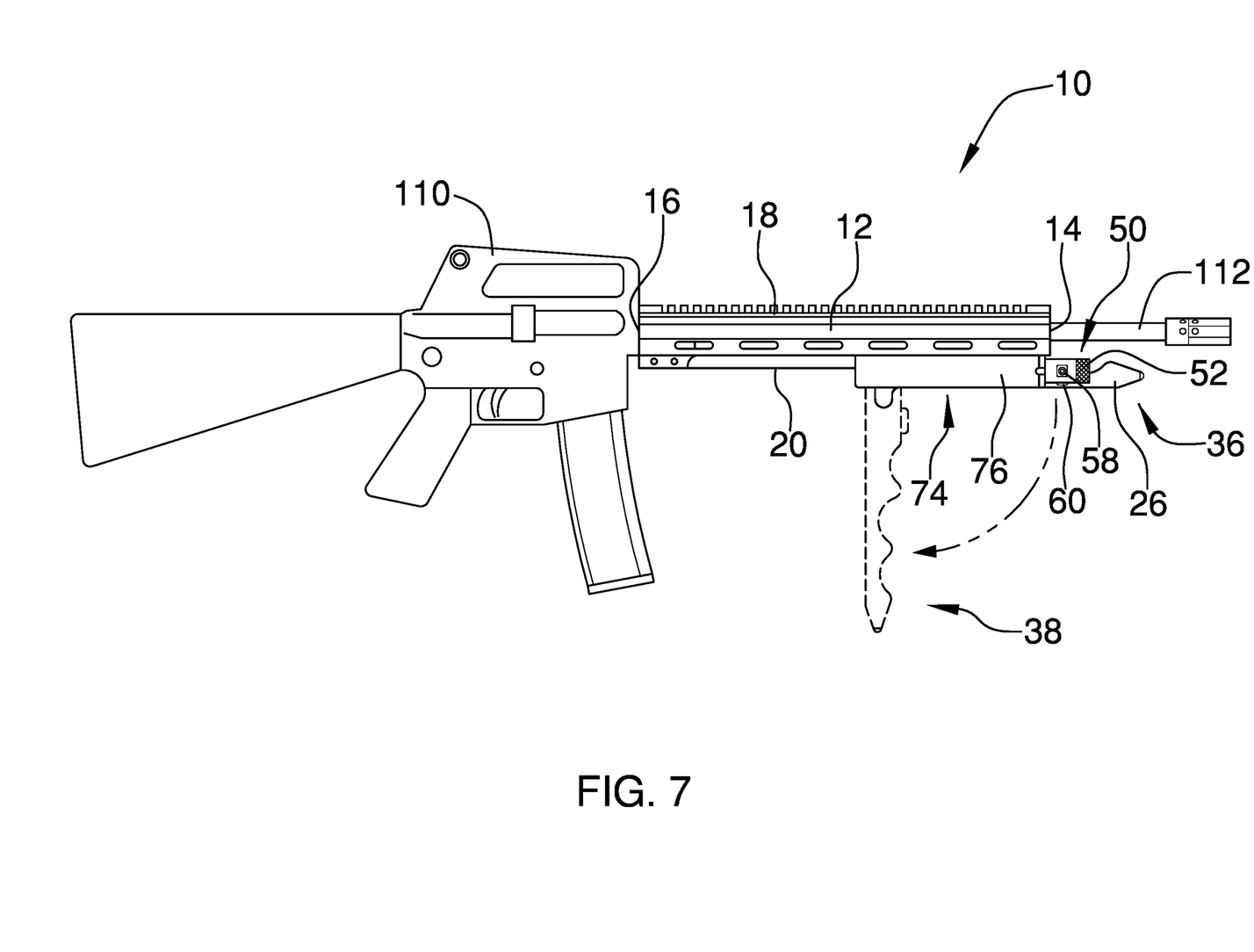
FIG. 7 is an in-use view of an embodiment of the disclosure.

With reference to FIG. 6, an embodiment is shown with a pair of monopods 26 substantially limited as described above. Each monopod 26 is interchangeably couplable to the handguard 12 and includes a tool 94 that is pivotally attached to the monopod 26. The tool 94 of each monopod 26 is pivotable near the distal end 30 of the monopod 26 between a deployed position 96 and a stored position 98. In the stored position 98, the tool 94 is partially stored in the monopod 26 and extends generally from the distal end 30 of the monopod 26 toward the proximal end 28 of the monopod 26. When in the deployed position 96, the tool 94 extends away from the monopod 26 in alignment with a longitudinal axis of the monopod 26.

The tool 94 of a first monopod 90 depicted in FIG. 6 is a knife blade 100. The first monopod 90 covers a cutting edge 102 of the knife blade 100 when it is in the stored position 98, and the cutting edge 102 faces a same direction as the front surface 32 of the monopod 26 when in the deployed position 96. The knife blade 100 also has a piercing point 104 which is positioned distally and faces away from the monopod 26 when the knife blade 100 is in the deployed position 96.

The tool 94 of a second monopod 92 shown in FIG. 6 is an ice pick 106. The second monopod 92 covers a pointed end 108 of the ice pick 106 when the ice pick 106 is in the stored position 98. The pointed end 108 is positioned distally and faces away from the monopod 26 when in the deployed position 96.

In use, the monopod 26 may be placed in the extended position 38 to support the firearm 110 on a support surface or orient the firearm 110 via grasping the monopod 26 when the handguard 12 is attached to the firearm 110. The monopod 26 may be placed in the retracted position 36 to facilitate the user in gripping or cradling the handguard 12 in the user's hand. The flashlight module 50 and the laser emitter module 62 may be used with or separately from the handguard 12 as described above. In embodiments where the monopod 26 has a tool 94 attached thereto, the monopod 26 may be removed and used as a gripping element for the tool 94. In some cases, it may be advantageous to use the tool 94 while the monopod 26 is attached to the handguard 12. For example, in embodiments with the knife blade 100, the knife blade 100 may be positioned in the deployed position 96 and the monopod 26 may be placed in the retracted position 36. In this manner, the knife blade 100 protrudes forwardly from the handguard 12 to define a bayonet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firearm attachment comprising:
   a handguard configured to mount to a barrel of a firearm having a magazine extending downwardly relative to the barrel;
   a monopod coupled to a bottom side of the handguard, the monopod being elongated between proximal and distal ends relative to the handguard such that the distal end of the monopod is configured to extend farther below the barrel of the firearm than the magazine of the firearm, the monopod being movable between an extended position and a retracted position, the monopod extending away from the handguard from the handguard from the proximal end to the distal end when in the extended position;
   a monopod fastener removably coupling the monopod to the handguard;
   a retractable tool attached to the monopod, the tool being movable between a stored position and a deployed position, the tool being at least partially housed in the monopod when in the stored position, the tool extending away from the monopod in alignment with a longitudinal axis of the monopod when in the deployed position; and
   wherein the tool is a knife blade, a cutting edge of the knife blade facing forwardly with respect to the handguard when the monopod is in the extended position and the knife blade is positioned in the deployed position, the knife blade having a piercing end positioned distally and facing away from the monopod when in the deployed position.

2. A firearm attachment comprising:
   a handguard configured to mount to a barrel of a firearm having a magazine extending downwardly relative to the barrel;
   a monopod coupled to a bottom side of the handguard, the monopod being elongated between proximal and distal ends relative to the handguard such that the distal end of the monopod is configured to extend farther below the barrel of the firearm than the magazine of the firearm, the monopod being movable between an extended position and a retracted position, the monopod extending away from the handguard from the handguard from the proximal end to the distal end when in the extended position;
   a monopod fastener removably coupling the monopod to the handguard;
   a retractable tool attached to the monopod, the tool being movable between a stored position and a deployed position, the tool being at least partially housed in the monopod when in the stored position, the tool extending away from the monopod in alignment with a longitudinal axis of the monopod when in the deployed position; and
   wherein the tool is an ice pick, the ice pick a pointed end of the ice pick being positioned distally and facing away from the monopod when in the deployed position.

3. A firearm attachment comprising:
   a handguard having a tubular shape, the handguard having a front end and a back end which are open to an interior space of the handguard, the handguard being shaped and configured to receive a barrel of a firearm having a magazine extending downwardly relative to the barrel into the interior space via the back end and out of the interior space via the front end;
   a monopod coupled to a bottom side of the handguard, the monopod being elongated between proximal and distal ends relative to the handguard such that the distal end of the monopod is configured to extend farther below the barrel of the firearm than the magazine of the firearm, the monopod being pivotable between an extended position and a retracted position, the monopod extending away from the handguard from the handguard from the proximal end to the distal end when in the extended position, the monopod extending forwardly along the handguard from the proximal end to the distal end when in the retracted position, the distal end tapering to a point, the monopod having a front surface which faces forwardly relative to the handguard when the monopod is in the extended position, the front surface of the monopod defining a plurality of recesses sized and configured to receive fingers of a user therein;
   a monopod fastener removably coupling the monopod to the handguard, the monopod fastener comprising an insertion member coupled to the handguard and a receiving member coupled to the monopod, the insertion member being receivable into the receiving member, the monopod fastener further comprising a latch member coupled to the monopod, the latch member being biased to interlock with the insertion member;
   a flashlight module mounted to the handguard, the flashlight module comprising:

a flashlight housing;

an illumination light source coupled to the flashlight housing, the illumination light source being oriented to emit light forwardly of the handguard;

a flashlight power supply mounted in the flashlight housing, the flashlight power supply being electrically couplable to the illumination light source, the flashlight power supply comprising a flashlight battery;

a flashlight switch mounted to the flashlight housing and electrically coupled to the flashlight power supply and the illumination light source, the flashlight switch being operable to electrically couple the flashlight power supply to the illumination light source to activate the illumination light source; and a flashlight charging port mounted to the flashlight housing and electrically coupled to the flashlight power supply;

a flashlight mount coupled to the handguard, the flashlight module being removably coupled to the handguard via the flashlight mount, the flashlight mount comprising a flashlight receiver which defines a flashlight-receiving cavity for receiving the flashlight module therein, the flashlight mount further comprising a flashlight magnet mounted to the flashlight module to secure the flashlight module in the flashlight receiver;

a laser emitter module mounted to the handguard, the laser emitter module comprising:

a laser emitter housing;

a laser light source coupled to the laser emitter housing, the laser light source being oriented to emit a visible laser forwardly of the handguard;

a laser emitter power supply mounted in the laser emitter housing, the laser emitter power supply being electrically couplable to the illumination light source, the laser emitter power supply comprising a laser emitter battery;

a laser emitter switch mounted to the laser emitter housing and electrically coupled to the laser emitter power supply and the laser light source, the laser emitter switch being operable to electrically couple the laser emitter power supply to the laser light source to activate the laser light source; and a laser emitter charging port mounted to the laser emitter housing and electrically coupled to the laser emitter power supply; and a laser emitter mount coupled to the handguard, the laser emitter module being removably coupled to the handguard via the laser emitter mount, the laser emitter mount comprising a laser emitter receiver which defines a laser emitter-receiving cavity for receiving the laser emitter module therein, the laser emitter mount further comprising a laser emitter magnet mounted to the laser emitter module to secure the laser emitter module in the laser emitter receiver;

wherein the flashlight mount and the laser emitter mount are positioned opposite each other across the monopod; and one of a knife blade and an ice pick being attached to the monopod, wherein the knife blade is movable between a stored position and a deployed position, the knife blade being at least partially housed in the monopod when in the stored position, a cutting edge of the knife blade being covered by the monopod when in the stored position, the knife blade extending away from the monopod in alignment with a longitudinal axis of the monopod when in the deployed position, the cutting edge of the knife blade facing a same direction as the front surface of the monopod when in the deployed position, the knife blade having a piercing end positioned distally and facing away from the monopod when in the deployed position, and the ice pick is movable between a stored position and a deployed position, the ice pick being at least partially housed in the monopod when in the stored position, a pointed end of the ice pick being covered by the monopod when in the stored position, the ice pick extending away from the monopod in alignment with a longitudinal axis of the monopod when in the deployed position, the pointed end of the ice pick being positioned distally and facing away from the monopod when in the deployed position.

\* \* \* \* \*